Nov. 26, 1957     H. D. HOOVER     2,814,580
HEAT TREATED AGRICULTURAL IMPLEMENT DISKS HAVING
NON-DIRECTIONAL FRACTURE CHARACTERISTICS
Filed Sept. 2, 1955     2 Sheets—Sheet 1
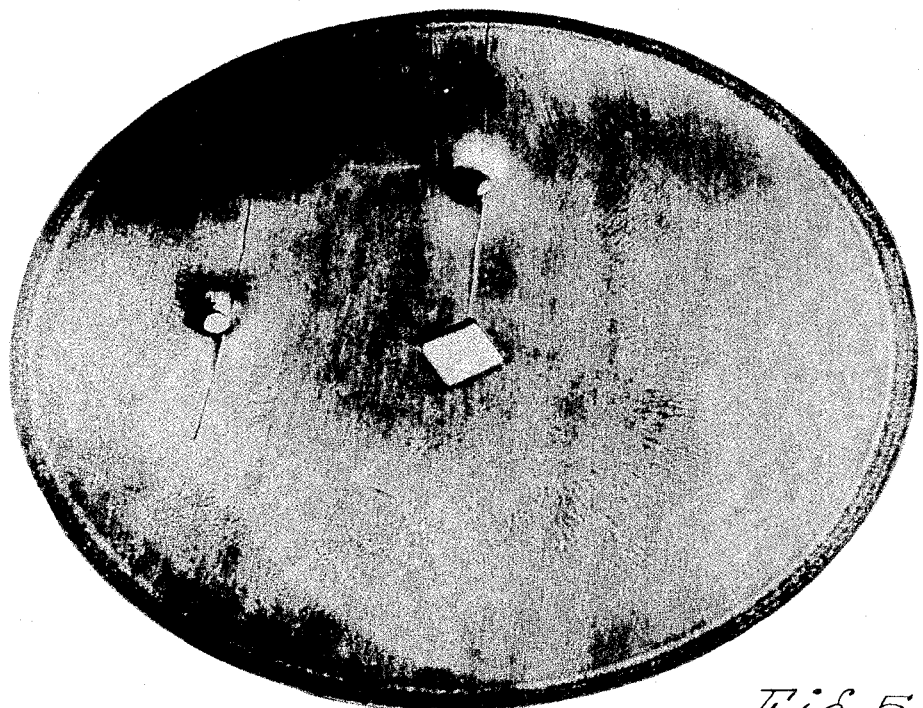
Fig. 5
Fig 3
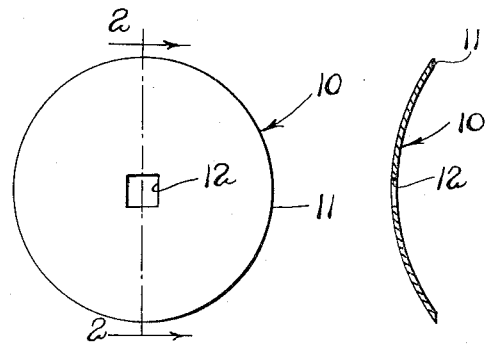
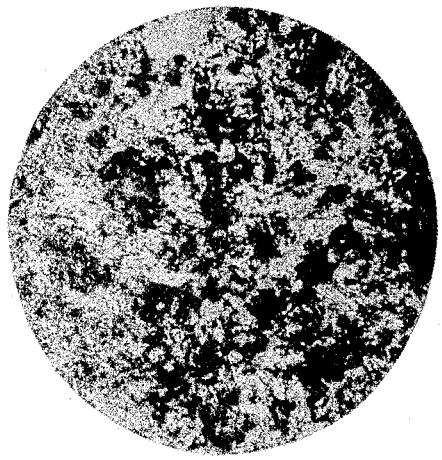
Fig 1     Fig 2
Inventor
Helen D. Hoover
By Paul O. Pippel
Atty.

Inventor
Helen D. Hoover
By Paul O. Pippel
Atty.

United States Patent Office 2,814,580
Patented Nov. 26, 1957

2,814,580

HEAT TREATED AGRICULTURAL IMPLEMENT DISKS HAVING NON-DIRECTIONAL FRACTURE CHARACTERISTICS

Helen D. Hoover, Grand Marais, Minn., assignor to International Harvester Company, a corporation of New Jersey Application September 2, 1955, Serial No. 532,137

4 Claims. (Cl. 148—31)

This invention relates to an improved article of manufacture. More particularly it relates to an improvement in agricultural disks having desirable structural properties.

In the tillage and cultivation of land, the implement disk plays an important part, whether it is used for plowing or cultivation. Because of difficult soil conditions, maintenance and wear of the disks has presented a serious problem to the farmer and to the manufacturer. Disks during use may be subjected to extreme stresses due to severe impact conditions occurring when the disks strike boulders, rocks and other elements likely to be found in some soils. In order to overcome the severe fracturing of the disks, extensive research has been conducted and certain facts have become apparent.

Disks for agricultural uses may be stamped out of sheet steel which has been straight rolled, therefore imparting to the product a somewhat linear fibre or grain flow with the flow lines substantially parallel across the disk. The material generally used is a high carbon steel, and upon current conventional heat treatment the disk assumes a microstructure which is predominantly of tempered martensite. It has been found in the use of disks of this type that directional cracks will occur in the disk when subjected to severe conditions. Such cracks are directional in that they tear linearly along the fibre flow in the direction of their rolling pattern. Directional tearing of the disks in this manner generally results in large chunks of metal breaking from the disks so that they are completely inadequate for further use. Thus when a disk is damaged in this manner the operator must immediately replace the same.

To alleviate this condition a prior art process includes the rolling of the metal in criss-cross or cross rolling relation. Hardened disks which have been manufactured by the cross rolling method have indicated a lower propensity toward directional failure once a crack starts at the edge of the disk. Thus in certain cases of fracture, only small portions would tear from the edges of the disks and though the disks would be defective they could still be used for a period of time. Thus the only improvement in the art with relation to agricultural disks has been the development of a rolling process which results in a fibre flow design having improved properties preventing to some extent the directional tearing of the metal disks when it strikes an obstruction.

Cross rolling of disks, of course, requires additional machine and operator time which considerably adds to the expense of manufacture. In addition the complete absence of directional fractures is not found to be answered by this process.

It is a prime object of this invention, therefore, to provide an improved agricultural implement disk.

It is another prime object to provide an improved implement disk having increased wear life resulting from increased strength and a decided absence of directionality of fracture upon the disk being damaged.

A still further object is to provide a heat treated implement disk having a microstructure consisting primarily of upper bainite, and without martensite.

Still another object is to provide an improved implement disk having the characteristic of non-directionality of fracture upon the disk being subjected to stresses beyond its normal capabilities.

Another object is to provide an improved implement disk that has been manufactured from a straight rolled or cross rolled steel, the disk having been austempered, and having inclusions in its micro-structure which are relatively flattened, the disk having a highly desirable characteristic of fracturing in a random manner as distinguished from fracturing directionally or linearly along the fibre flow lines determined by the inclusions in the disk.

These and further objects will become more apparent from a reading of the specification when examined in connection with the accompanying sheets of drawings.

In the drawings:

Figure 1 is a side elevational view of an implement disk;

Figure 2 is a sectional view taken along the line 2—2 of Figure 1;

Figure 3 is an enlarged photograph of the microstructure of an austempered disk;

Figure 5 is a photographic view showing the results of a ball fracture test on a conventional straight rolled disk;

Figures 1 and 2 show a conventional agricultural implement disk 10, of dish shape, having a cutting edge 11 and a hub portion 12. The cutting edge of disks of this type may include a number of arcuate shearing edges (not shown) and disks of this type are also in some instances of flat rather than dish shaped construction, the invention herein disclosed being applicable to all agricultural disks regardless of shape.

In manufacture the disks may be formed from a suitable billet which is flattened by rolling, or more likely the disks may be cut from sheet steel which has been rolled in a single direction, the terminology for such a process being "straight rolled." Or the disks may be subjected to rolling mill techniques whereby the rolls pass in a plurality of directions over the metal, the terminology of such process being "cross rolling." It is not deemed necessary to elaborate upon the manner in which the rolling is accomplished since such rolling is conventional and usually takes place between rolls under pressure through which the steel sheet or billet is fed.

Figure 4:
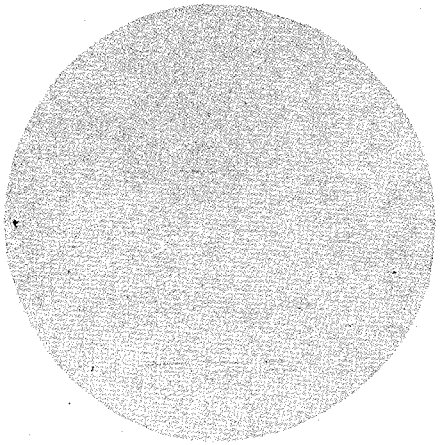
Figure 4 is a magnification photograph showing inclusions in the straight rolled disk of Figures 1 and 2.

In the straight rolling of disk steel the rollers pass over the steel sheet in one direction. The disk blanks are then cut from the sheets and subsequently formed into disks. By this process, as shown in Figure 4, the inclusions are substantially all linearly directed across the disk in substantially parallel fashion. The inclusions essentially comprise such elements as silicates, oxides, sulphides, and other non-metallic substances and in shape are generally long, and ribbon-like and are malleable at the rolling temperature. The inclusions are also said to determine or influence the fibre flow lines whereby in directional fracture or failure the metal tears linearly along the fibre flow lines.

By cross rolling the sheet steel the inclusions are flattened or widened, the length however remaining substantially the same. This change in the shape of the inclusions is believed to be an important cause of the desirable results which have been obtained with cross rolled disks.

The chemical composition of a steel which has been particularly satisfactory for implement disks and which is well adapted for the process hereinafter described may be as follows:

|  | Percent |
|---|---|
| Carbon | 0.80 to 0.93 incl. |
| Manganese | 0.70 to 1.00 incl. |
| Phosphorous | .040 max. |
| Sulfur | .050 max. |
| Silicon | 0.15 to 0.30 incl. |
| Chromium | Residual. |
| Nickel | Residual. |
| Molybdenum | Residual. |

However, the process is also adaptable to any steel composition which will produce satisfactory mechanical properties when austempered in a bath held at 650° F. to 850° F.

While reference above has been made to a cross rolled disk, the improved process may be also practiced with a straight rolled disk, thus eliminating a more costly product, yet producing a disk which has improved qualities over any known disks.

After the disk has been formed either from straight rolled or cross rolled steel, the same is heated in a suitable furnace or salt bath above the AC 3 (critical or transformation) temperature into the austenitic state (commonly referred to as austenitizing). The disks are then quenched in a salt bath held at a temperature of 650° F. to 850° F. until transformation has occurred from an austenitic to a primarily bainitic structure, without martensite. This process of heat treating is also known as austempering, which is defined in the metallurgical field as a hardening process based upon isothermal transformation of austenite to bainite. Austempering takes place in this process wherein austenite is transformed into bainite without intermediate production of martensite.

The E. C. Bain Patent 1,924,099, August 29, 1933, describes the process known as austempering which is applied to the present invention resulting in a new and highly desirable implement disk. The patent concisely describes the process which consists primarily of thermally hardening a high carbon steel, quenching the steel from a temperature above the critical temperature below approximately 1000° F., but above the temperature of rapid martensite formation, and holding the steel in such an intermediate temperature for a time interval sufficient to obtain substantial conversion of the austenite to crystal structures other than martensite, namely bainite. The process thus described is applied and included in the process of the present invention to provide the improved result heretofore not contemplated.

Figure 3 shows typical microstructure of the steel in a disk after the austempering process has been performed. In addition this figure shows a certain amount of fine pearlite and transition products which may occur during the process but do not affect the desired characteristics of the austempered disk. Figure 4 shows that the material is straight rolled by the pattern of the inclusions which extend linearly across the disk in substantially parallel relation.

The above process therefore results in a disk having a primarily bainitic microstructure. Actual field tests and ball tests definitely prove that a disk of this type after treating will have the desirable feature referred to in this application, "non-directionality." This term means that when a fracture occurs in the disk, the fracture may start parallel to the rolling direction or fibre flow lines, but progression of the fracture occurs in random or vari-directional direction with respect to the rolling direction or fibre flow. This result is particularly desirable in the field under severe service conditions since it prevents large pieces from breaking out of any disk. Small sections which break out on a "non-directional" disk will permit the continued use of the disk for a period of time.

Figure 6:
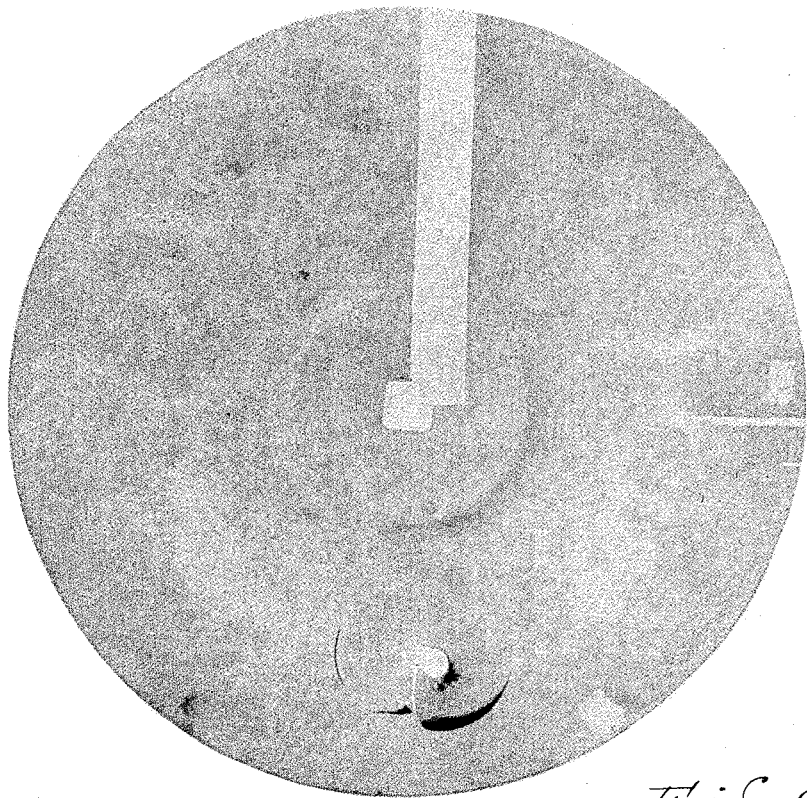
Figure 6 is a photographic view of an improved austempered straight rolled disk showing the results of a ball fracture test.

Figures 5 and 6 show a conventional disk and an improved austempered disk, both having been subjected to the approved ball test. In this test a hardened steel ball is forced through a drilled hole in the disk, the drilled hole being of lesser diameter than the ball. Figure 5 shows the directional breakage or fracture of a conventionally heat treated disk, and Figure 6 shows an improved austempered straight rolled disk indicating that breakage and fracture is of a non-directional character. Repeated tests with the austempered disks have shown their superiority and freedom from directional fracture.

Essentially then the present process contemplates the heat treatment of a high carbon steel disk which has been straight or cross rolled, the austenitizing of the disk and the subsequent isothermal quenching to produce a microstructure or crystal structure which is other than austenite or martensite, such as bainite with certain amounts of pearlite, the heat treating process in conjunction with the straight or cross rolling process, in combination, providing an improved structural change or result which is exemplified by random fracture of the disk as against directional cracking or fracturing.

Thus it is apparent that an improved implement disk has been described and one which when treated with an austempering process provides a completely new and different desired result departing radically from known processes of manufacturing disks. The objects of the invention have been fully achieved and it must be understood that changes may be made without departing from the spirit of the invention disclosed or the scope thereof as defined in the appended claims.

What is claimed is:

1. A heat treated steel implement disk having a primarily bainitic microstructure, said disk having fibre flow lines extending linearly and substantially parallel through said disk, said disk having a fracture characteristic wherein during fracture the tearing of the disk is in a vari-directional manner relative to the fibre flow lines of the disk.

2. A heat treated steel implement disk having a predominantly bainitic microstructure, with inclusions therein of a relatively flat and elongated shape with a fibre grain flow extending linearly and substantially parallel across the disk, said disk having fracture characteristics under severe stresses of cracking in a vari-directional manner with respect to the fibre grain flow of the disk.

3. A heat treated steel implement disk having a relatively sharp peripheral ground engaging edge, said disk having a predominantly bainitic microstructure throughout a major portion thereof, and fracture characteristics whereby during structural failure the disk cracks in a vari-directional manner relative to the fibre flow structure of the disk.

4. A heat treated high carbon steel implement disk having inclusions defining a generally linear and parallel fibre flow structure and a predominantly bainitic microstructure, the said disk having fracture characteristics at ultimate stresses whereby the disk cracks in a vari-directional manner relative to the fibre flow structure of the disk.

References Cited in the file of this patent

UNITED STATES PATENTS

| 1,924,099 | Bain et al. | Aug. 29, 1933 |
| 2,395,184 | Hume et al. | Feb. 19, 1946 |

OTHER REFERENCES

Cold Working of Metals, A. S. M., 1949, pages 107 and 108.